United States Patent [19]
Loffelman et al.

[11] 3,947,374
[45] Mar. 30, 1976

[54] SUBSTITUTED HALOTRIAZINES AS PEROXYGEN BLEACH ACTIVATORS

[75] Inventors: Frank Fred Loffelman, Somerville; Thomas Eugene Brady, Piscataway, both of N.J.

[73] Assignee: American Cyanamid Company, Stamford, Conn.

[22] Filed: July 16, 1974

[21] Appl. No.: 489,015

Related U.S. Application Data

[63] Continuation-in-part of Ser. No. 343,313, March 21, 1973, abandoned.

[52] U.S. Cl. ............. 252/102; 252/99; 252/186; 260/248 R; 260/249.5; 260/249.8; 423/272
[51] Int. Cl.² ........................................ C11D 7/54
[58] Field of Search .............. 252/95, 99, 102, 186; 260/248 R, 248 LS, 249.5, 249.8; 423/272

[56] References Cited
UNITED STATES PATENTS 3,741,903  6/1973  Evans................................ 252/95

Primary Examiner—Mayer Weinblatt
Attorney, Agent, or Firm—John L. Sullivan

[57] ABSTRACT

Halotriazines of the formula:

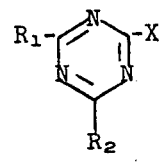

where X represents halogen; and $R_1$ and $R_2$ individually represent halogen, hydroxy, mercapto, alkyl, alkenyl, alkoxy, alkylmercapto, aryl, aryloxy, arylmercapto, di-alkoxyphosphinyl or

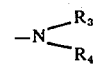

where $R_3$ and $R_4$ individually represent hydrogen, alkyl, alkoxy, cyanoalkyl, hydroxyalkyl, carboxyalkyl, chloroalkyl, alkoxyalkyl, acyloxyalkyl, sulfonalkyl, aryl, haloaryl, sulfoaryl, acylaminoaryl, carbamoylalkyl or arylsulfonyloxyalkyl, or where $R_3$ and $R_4$ taken together complete a ring structure selected from morpholine, piperazine, piperdine, succinimide, maleimide and phthalimide rings; are bleach activators of high activating strength and good storage stability in peroxygen bleaching compositions.

16 Claims, No Drawings

SUBSTITUTED HALOTRIAZINES AS PEROXYGEN BLEACH ACTIVATORS

This case is continuation-in-part of Ser. No. 343,313 filed Mar. 21, 1973, now abandoned. This invention relates to improved bleaching compositions comprising hydrogen peroxide or a hydrogen peroxide-releasing compound and, as an activator for the peroxide-releasing compound, a substituted halotriazine derivative. More particularly, the invention relates to such improved bleaching compositions wherein the substituted halotriazine activator compounds are represented by the formula:

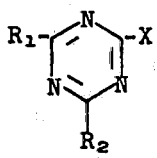

where X represents halogen; and $R_1$ and $R_2$ individually represent halogen, hydroxy, mercapto, alkyl, alkenyl, alkoxy, alkylmercapto, aryl, aryloxy, arylmercapto, dialkoxyphosphinyl or

where $R_3$ and $R_4$ individually represent hydrogen, alkyl, alkoxy, cyanoalkyl, hydroxyalkyl, carboxyalkyl, chloroalkyl, alkoxyalkyl, acyloxyalkyl, sulfoalkyl, aryl, haloaryl, sulfoaryl, acylaminoaryl, carbamoylalkyl or arysulfonyloxyalkyl, or where $R_3$ and $R_4$ taken together complete a ring structure selected from morpholine, piperazine, piperidine, succinimide, maleimide and phthalimide rings. In each instance where alkyl, alkenyl or alkoxy is mentioned, the term is intended to designate lower (i.e., $C_1$–$C_5$) alkyl, lower (i.e., $C_1$–$C_5$) alkenyl or lower (i.e., $C_1$–$C_5$) alkoxy.

Although the halotriazine derivatives defined by the above formula are derivatives of s-triazines, similarly substituted derivatives of unsymmetrical triazine rings are also contemplated as activators for the bleach composition of the invention.

The use of various compounds as peroxygen bleach activators has previously been disclosed. For example, French Pat. No. 1,583,330 discloses the use of N-acyl derivatives of imidazole, pyrazole and triazole, and British Pat. No. 1,046,251 discloses the use of N-acyl derivatives of pyridazine, triazole and pyrazole as peroxygen salt activators in bleaching compositions for textile materials. Thus, perborate bleaching compositions containing such activators will remove a greater percentage of stains from a textile material than the same compositions without the activator.

However, many peroxygen bleaching compositions containing such activators have not proved satisfactory for one or more reasons, such as inadequate bleaching at 50° to 70°C., the typical working temperature range of modern laundry washing machines, or because the activators tend to deteriorate and lose their effectiveness in the time interval between manufacture and actual use of the bleaching compositions. Thus, commercial bleach compositions are often subject to storage for considerable periods of time under varying conditions of temperature and humidity in the warehouse or on the supermarket shelf before consumer use and, to be satisfactory, their activity must be maintained without appreciable loss during this period.

In accordance with the present invention, it has now been found that the compounds as defined above are superior activators for peroxygen bleaching compositions. Thus, bleaching compositions made with these activators exhibit good bleaching effectiveness at the relatively low temperature of about 10° to 70°C. Also, because of the good storage stability of the activators themselves, the bleaching compositions may be stored for surprisingly long periods of time under a range of temperature and humidity conditions without suffering significant loss in activity. Furthermore, the compositions are safer both for all fabrics and the dyes used to color all fabrics than conventional chlorine-containing bleaches.

In addition, the compositions of this invention are of useful application in various other area where a bleaching effect or sanitizing effect is desired. Examples of such other applications include the bleaching of human hair or animal hair (for example in treatment and preparation of furs); bleaching of paper and paper product; sanitizing or disinfecting swimming pools.

The compounds of the invention, as exemplified by the chloro substituted s-triazine derivatives, where X in the above formula is chlorine, may be prepared by known methods generally involving the use of cyanuric chloride as starting material. Thus, using conventional conditions, either one or two of the chlorines in cyanuric chloride are replaced by various groups to provide the substituted chlorotriazines of the invention.

In general, the chloro compounds of the invention may be prepared by methods disclosed in the following: J. T. Thurston, et al., J. Am. Chem. Soc., 73, 2981 (1951); J. R. Dudley, et al., J. Am. Chem. Soc., 73, 2986 (1951); and F. C. Schaefer, et al., J. Am. Chem. Soc., 73, 2990 (1951).

Analogous methods are also used for the preparation of corresponding bromo and fluoro analogs, starting with cyanuric bromide and cyanuric fluoride.

The following are examples of reagents which may be used to replace one or two of the chlorines in cyanuric chloride to give the compounds of the invention.

Water
Alcohols, such as:
  methanol,
  ethanol,
  methoxyethanol,
  propanol,
  isopropanol,
  butanol,
  ethylene glycol,
  glycerol and
  phenol and substituted phenols
Amines, such as:
  ammonia,
  methylamine,
  ethylamine,
  propylamine,
  dipropylamine,
  ethanolamine,
  diethanolamine,
  diethylamine,
  dimethylamine,
  di(isopropanolamine),
  alkylenediamines,
  allyl amine, di(allyl)amine,
propargylamine,
iminobispropionamide,
glycolamine,
diglycolamine,
hydroxyethylaminopropionamide,
aniline,
iminobisacetonitrile,
iminobispropionitrile,
N-methylaniline,
orthanilic acid,
metanilic acid,
sulfanilic acid,
haloanilines,
toluidines,
anisidines,
sulfamylamide,
aminobenzoic acids,
morpholine,
piperidine,
piperazines,
N-methyl piperazine,
pyrrolidine,

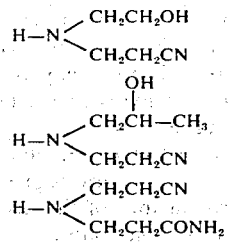

In the bleaching compositions of the invention, the proportion of the activator compound to the hydrogen peroxide-releasing compound may vary widely, the peroxide-releasing compound usually being in at least a small excess. For practical purposes, a mole ratio of activator compound to hydrogen peroxide-releasing compound of from about 1:1 to about 1:10 is suitable, the preferred ratio being between about 1:1 and 1:3. Although higher amounts of the activator may be used, such use would be uneconomical since no advantage in terms of bleaching activity would be attained thereby.

The oxygen bleaches useful in these bleaching compositions are hydrogen peroxide and organic peroxides and inorganic peroxygen salts that liberate hydrogen peroxide in water. Examples of organic peroxide bleaching compounds are urea peroxide, benzoyl peroxide, methyl ethyl ketone peroxide, and the like. Examples of inorganic peroxygen bleaching compounds are alkali metal perborates, percarbonates, perphosphates, persulfates, monopersulfates, and the like. Mixtures of two or more bleaching compounds can, of course, be used if desired. Similarly, two or more activators can be used in combination, if desired. While, therefore, peroxide-releasing compounds in general may be used in the compositions of the inventions, the preferred compounds are sodium perborate (for economic considerations) and sodium percarbonate (for ecological considerations).

The activated bleach compositons of the invention are useful for bleach applications for various substrates including fabrics, particularly when incorporated in detergent compositions for household or commercial laundering purposes. An important property of the compositions in this regard is their ability to remove stains including food stains, such as those of coffee, tea and wine, while maintaining the purity of white in uncolored textiles. Aside from food stains, soiling in general may be removed such as grass stains, urine, and the like.

The detergent component of the activated bleach compositions may be any of the conventional types such as anionic, cationic, nonionic or amphoteric. Examples of typically suitable anionic detergents include the alkali metal or alkaline earth metal salts of higher alkylbenzene sulfonates, olefin sulfonates, higher alkyl sulfates and higher fatty acid monoglyceride sulfates. Typical cationic detergents include tetraalkyl ammonium salts in which one of the alkyl groups contains approximately 12 to 18 carbons such as dodecyltrimethylammonium chloride or ethyldimethyloctadecylammonium methosulfate.

Typical nonionic detergents include polyglycol ethers of alkanol amides of higher fatty acids and also polyglycol ethers of higher alkanols and higher fatty acids. Amphoteric detergents include, for example, aminofatty acids such as dimethylaminopropionic acid and iminodifatty acids such as methyliminodilauric acid.

The compositions may also contain various additives which have no adverse effect on the bleaching action such as brighteners, enzymes, etc; other components may also be present as are conventionally used in detergent compositions including so-called "builders", representatives of which are various sodium phosphate salts, carbonates, silicates, and the like as usually encountered in the art. In addition to the utility mentioned above, the compositions of the invention are also useful for their germicidal properties in various applications for control of microbial growth. Application may be made to any surface or substrate where such control is desired. The treatment of swimming pool water and swimming pool surfaces with the compositions of the invention is especially efficacious since the usually lower temperatures of these environments prevent effective use of other antimicrobial agents. A related utility is the treatment of water supplies to render the same fit for human consumption or for industrial use, such as the sanitization of field water for consumption by military personnel or the treatment of industrial process water so it can be reused in industrial processes or by the surrounding community.

The following examples will serve to illustrate the invention.

EXAMPLE 1

Preparation of 2,4-Dichloro-6-Methoxy-s-Triazine

To 200 ml. of methanol and 25 ml. of water were added 33.6 g. (0.4 mole) of sodium bicarbonate and 36.8 g. (0.2 mole) of cyanuric chloride. This mixture was stirred at 30°C. for 30 minutes until the evolution of carbon dioxide had nearly ceased, and water was then added. The crystalline solid which separated was filtered, washed with water, and dried in a vacuum desiccator. The yield of crude 2,4-dichloro-6-methoxy-s-triazine was 10.5 g. (58% yield), m.p. 87°–89°C. After recyrstallization of the product from heptane, the m.p. was 88°–90°C.

EXAMPLES 2–5

A number of monochloro derivatives were prepared by reaction of the 2,4-dichloro-6-methoxy-s-triazine with various amines replacing one of the chlorines according to the following procedure.

A slurry of 2,4-dichloro-6-methoxy-s-triazine was first prepared by drowning 0.1 mole solution thereof in 100 ml. acetone with 150 ml. of an ice/water mixture at 0°–5°C. Two equivalents (0.2 mole) of the amine was then added at 0°–5°C. and the reaction mixture allowed to warm to room temperature. The mixture was then heated to 40°C. and filtered warm. The precipitate was washed with cold water, dried, and recrystallized from hexane.

| Ex. No. | Amine Used | Product Yield | M.P. |
|---|---|---|---|
| 2 | $HN(C_2H_5)_2$ | 96% | 83–86°C. |
| 3 | Aniline | 97% | 136–38°C. |
| 4 | morpholine | 61% | 107–108°C. |
| 5 | $HN(CH_3)C_6H_5$ | 20% | 96–97.5°C. |

EXAMPLE 6

Preparation of 2-Chloro-4,6-Dimethoxy-s-Triazine

To 45 g. of methanol and 5 g. of water were added 16.8 g. (0.2 mole) of sodium bicarbonate and 18.5 g. (0.1 mole) of cyanuric chloride. Carbon dioxide was liberated at a moderate rate as the temperature rose to 35°C. The mixture was refluxed for 30 minutes after gas evolution had nearly ceased. It was then cooled, diluted with water, and filtered. The crystalline product was washed with water until chloride free and was dried in a vacuum desiccator. The crude product weighed 13 g. (74% yield), m.p. 74°–76°C. Recrystallization from heptane gave m.p. 75°–76°C.

EXAMPLE 7

Preparation of 2,4-Dichloro-6-di(cyanomethyl)amino-s-triazine

A solution of 9.5 g. (0.1 mole) of iminodiacetonitrile in 100 ml. dioxane was added to a stirred solution of 9.2 g. (0.05 mole) of cyanuric chloride in 100 ml. dioxane. The suspension was stirred at ambient temperature for 1 hour. An additional 100 ml. dioxane was added and mixture heated to 50°C. for 1 hour and filtered. The filtrate was diluted with 500 ml. ice/water and the solid filtered and dried to give 9.6 g. (80% yield), m.p. 154°–158°C.

EXAMPLE 8

Preparation of 2-Chloro-4,6-bis(dicyanomethylamino)-s-triazine

A solution of 10.8 g. (0.06 mole) of cyanuric chloride was dissolved in 300 ml. dioxane and 18.0 g. (0.8 mole) of iminodiacetonitrile added in small protions to the stirred solution such that the temperature increased to 35°C. (slight exotherm). The addition caused a thick gellatinous mass but stirring was not impeded. After all the nitrile was added, the suspension was placed on a steam bath and heated to 80°C. 6.8 g. NaOH, as 35 ml. of a 20% solution, was added dropwise over one-half hour and the reaction mixture heated for an additional one-half hour. The solution was decanted from a small amount of gummy residue and the clear solution poured over 2 liters of water. The solid formed was filtered and dried to give 16.5 g. (76.3% yield) of $N^2$, $N^4$-bis(diiminobisacetonitrilo)-6-chloro-s-triazine, m.p. 195°–196°C.

EXAMPLE 9

Preparation of 2-chloro-4-methoxy-6-(dicyanomethyl)amino-s-triazine

A slurry of 20.0 g. iminodiacetonitrile in 100 ml. dioxane was added to 20.0 g. (0.22 mole) of 2,4-dichloro-6-methoxy-s-triazine in 200 ml. dioxane and the mixture heated on a steam bath for 1 hour, during which 25 g. sodium bicarbonate was added in 2.5 g. increments. The hot solution was gravity filtered and the filtrate diluted with 1 liter of water and the resultant solid filtered and dried. Wt.=11.0 g. (48% yield), m.p. 164°–166°C.

EXAMPLE 10

Preparation of a Mixed Methyl, Chloro-s-triazine Composition

A solution of 25.8 g. (0.14 mole) cyanuric chloride in 600 ml. methylene chloride was cooled to −20°C. and with stirring 200 ml. of a 3 mole solution of methyl magnesium bromide in tetrahydrofuran was added thereto. The temperature was maintained below −15°C. for 3 hours, then 72 ml. of water was added dropwise and the mixture was allowed to warm to room temperature. Anhydrous magnesium sulfate, 80 grams, was added and after stirring, the solid was isolated by filtration and washed with methylene chloride.

The filtrate and washings were distilled under reduced pressure and then the residue was extracted with pentane. Evaporation of the pentane gave 7.9 g. of a yellow solid melting at 65°–72°C. Sublimation at 150°C. and 10 mm. pressure gave a product which by mass spectroscopy was determined to be 60% 2-chloro-4,6-dimethyl-s-triazine and 40% 2,4-dichloro-6-methyl-s-triazine.

EXAMPLE 11

Preparation of 2-bromo-4,6-dimethoxy-s-triazine

A mixture of 3.17 g. (0.01 mole) of cyanuric bromide, 1.78 g sodium bicarbonate and 18 ml. methanol was heated under refluxing conditions with stirring for 2 hours. The mixture was cooled and diluted with 50 ml. water. The product was isolated by filtration, washed with water and dried, giving 1.79 g. of white solid, m.p. 118°–120°C.; crystallized from 75 ml. cyclohexane, m.p. 120°–121°C.

EXAMPLE 12

Preparation of 2,4-Dichloro-6-di(hydroxyethyl)amino-s-triazine

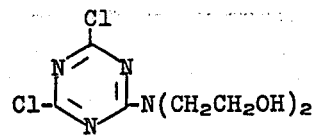

25 Grams cyanuric chloride was dissolved in 145 ml. acetone and the solution poured over 100 grams of ice. Sodium bicarbonate (12.4 grams) was added. While maintaining the temperature at 10°C., diethanolamine (15.5 grams) was added dropwise over a period of about 30 minutes. The temperature was raised to 20°–25°C. and the mixture stirred for about 1 hour. The reaction mixture was filtered, washed with water and dried to give 31.4 grams of product.

EXAMPLE 13
Preparation of 2,4-Dichloro-6-di(acetoxyethyl)amino-s-triazine

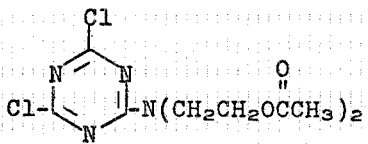

12.7 Grams of the product of Example 12, 19.5 grams of acetyl chloride and 250 ml. benzene were mixed and heated at refluxing temperature for about 3 hours until evolution of HCl ceased. The benzene was removed in vacuo along with any excess acetyl chloride leaving an oil which crystallized on standing. The crystals were recrystallized from hexane to give 9.5 grams of product, m.p. 88°–93°C.

Following a similar procedure except for the substitution of 0.25 mole of p-toluene sulfonyl chloride for the acetyl chloride, the tosyloxyethyl analog was obtained.

EXAMPLE 14
Preparation of 2,4-Dichloro-6-phthalimidyl-s-triazine

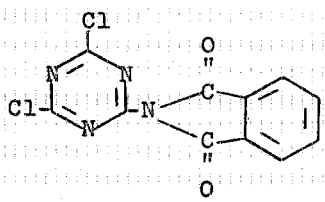

18.5 Grams cyanuric chloride, 18.5 grams potassium phthalimide and 200 ml. acetone were combined and stirred at 0°–5°C. for 7 hours. The reaction mixture was then allowed to warm to room temperature and stirred an additional 15 hours. The white slurry was filtered, washed with cold acetone, reslurried in 250 ml. cold water, filtered, washed with water and dried. On recrystallization from benzene, there was obtained 17 grams of product, m.p. 175°–179°C.

Evaluation of Compounds as Bleach Activators

The compounds of Examples 1–14, plus additional compounds (Examples 15–44) prepared after the fashion of the compounds of Examples 1–14, were evaluated as activators applied with a detergent and sodium perborate. In the tests, the mole ratio of activator used to sodium perborate was 1:1.1, although, depending on the result, the ratio was sometimes varied to a lesser amount of the activator. The test results obtained are shown in Tables I and II where the activator compounds are identified by the $R_1$ and $R_2$ radicals thereof in the general formula shown in each table.

The test procedure was as follows: Five-gram swatches of desized, 80 × 80 cotton fabric are stained with tea in the following manner. Five tea bags are placed in 1 liter of water and boiled for 5 minutes. The swatches are then immersed in the tea and the boiling is continued for another 5 minutes. The swatches are then removed from the tea, wrung out, dried at 200°–215°F., rinsed in cold water and again dried.

Two of the stained cotton swatches are placed in a stainless steel Terg-O-Tometer, a test washing machine, manufactured by U.S. Testing Company and used in the detergent trade for evaluation purposes. Forty grams of unstained cotton fabric and 1 liter of distilled water at 120°F. are then added so as to provide a typical household washing machine water to cloth ratio of about 20:1. There are then added 2.0 grams of "Tide" (an anionic alkylaryl sulfonate type detergent), 0.33 gram of anhydrous sodium perborate (or an equivalent of hydrated material) and the indicated amount of the activator compound. The Terg-O-Tometer is operated at 100 cycles per minute for 15 minutes at a temperature of 120°F. The swatches are then removed, rinsed with cold water, and dried at room temperature.

Reflectance readings on the swatches are taken both before and after laundering using a Hunter Model 25-M Reflectometer with a blue filter. The swatches are backed with a white porcelain plate and read once on each side. Fluorescent effect is excluded from all readings.

The reflectance readings are averaged and the percent stain removal is obtained in accordance with the following formula in which R is the symbol for Reflectance:

$$\text{Total \% stain removal} = \frac{R\,(\text{bleached}) \text{ minus } R\,(\text{stained})}{R\,(\text{unstained}) \text{ minus } R\,(\text{stained})} \times 100$$

Control runs are also made for each set or series of evaluation tests using detergent and sodium perborate with no activator. The percent stain removed may vary somewhat on the Control due to variations in the cloth and the tea used to produce the stains.

This application is a continuation-in-part of application Ser. No. 343,313, filed Mar. 21, 1973.

TABLE I

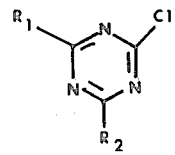

| Example No. | $R_1$ | $R_2$ | % Stain Removed Control | Activator (g.) | % Stain Removed |
|---|---|---|---|---|---|
| 1 | —Cl | —OCH$_3$ | 40 | 0.54 | 73.6 |
| 2 | —OCH$_3$ | —N(C$_2$H$_5$)$_2$ | 35.9 | 0.65 | 69.6 |
| 3 | —OCH$_3$ | —NHC$_6$H$_5$ | 35.9 | 0.72 | 65.1 |

TABLE I-continued

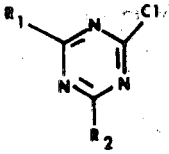

| Example No. | R₁ | R₂ | % Stain Removed Control | Activator (g.) | % Stain Removed |
|---|---|---|---|---|---|
| 4 | —OCH₃ | -N(morpholine) | 35.9 | 0.69 | 71.3 |
| 5 | —OCH₃ | —N(CH₃)(C₆H₅) | 38.2 | 0.75 | 61.7 |
| 6 | —OCH₃ | —OCH₃ | 40 | 0.3 | 83.8 |
|   |   |   |   | 0.53 | 78.6 |
| 7 | —Cl | —N(CH₂CN)₂ | 39.9 | 0.73 | 75.4 |
|   |   |   |   | 0.37 | 70.0 |
|   |   |   |   | 0.19 | 63.9 |
| 8 | —N(CH₂CN)₂ | —N(CH₂CN)₂ | 43.1 | 0.36 | 79.5 |
| 9 | —OCH₃ | —N(CH₂CN)₂ | 40.7 | 0.72 | 81 |
|   |   |   |   | 0.36 | 78.7 |
|   |   |   |   | 0.18 | 71.5 |
| 10 | —Cl (40%) —CH₃(60%) | —CH₃ | 29.8 | 0.43 | 84.2 |
| 12 | —Cl | —N(CH₂CH₂OH)₂ | 40 | 1.08 | 74.1 |
|   |   |   |   | 0.53 | 78.6 |
| 13 | —Cl | —N(CH₂CH₂OCCH₃)₂ (O=C) | 36.3 | 1.01 | 69.3 |
| 14 | —Cl | -N(phthalimide) | 36.0 | 0.89 | 76.8 |
| 15 | —Cl | —NHC₆H₅ | 29.3 | 0.72 | 67.1 |
| 16 | —Cl | —N(C₅H₅)₂ | 40 | 0.62 | 68.5 |
|    |     |            |    | 0.31 | 66.3 |
| 17 | —Cl | —N(CH₂CH₂CN)₂ | 32.9 | 0.71 | 58.5 |
| 18 | —Cl | —N(CH₂CH₂CONH₂)₂ | 40.0 | 0.90 | 58.4 |
|    |     |               |      | 0.45 | 60.6 |
| 19 | —Cl | P(OCH₃)₂ (O=) | 38.2 | 0.79 | 54.6 |
|    |     |           |      | 0.39 | 50.8 |
| 20 | —OCH₃ | —NH₂ | 32.9 | 0.48 | 76.2 |
| 21 | —OC₆H₅ | —OC₆H₅ | 39.0 | 0.92 | 55 |
|    |        |         |      | 0.46 | 45.5 |
| 22 | —NH₂ | —NH₂ | 38.8 | 0.44 | 55.6 |
| 23 | —NHC₆H₅ | —NHC₆H₅ | 39.0 | 0.92 | 41.4 |
|    |         |          |      | 0.46 | 43.2 |
| 24 | —NHCH₂CH₂OH | —NHCH₂CH₂OH | 35.9 | 0.70 | 49.4 |
| 25 | -N(morpholine) | -N(morpholine) | 35.9 | 0.87 | 44.9 |
| 26 | —Cl | —HO(Na salt) | 30.1 | 0.88 | 49.2 |
| 27 | —OH | —HO(Na salt) | 27.1 | 0.61 | 36.1 |
| 28 | —OCH₃ | —N(CH₂CH₂CN)₂ | 31.4 | 0.81 | 75.9 |
| 29 | —OCH₃ | —N(CH₂CH₂OH)₂ | 31.4 | 0.75 | 71.7 |
| 30 | —OCH₃ | —N(CH₃)₂ | 31.4 | 0.57 | 64.9 |
| 31 | —OCH₃ | —OC₆H₅ | 31.4 | 0.72 | 75.9 |
| 32 | —Cl | —NHC₆H₅ | 29.3 | 0.72 | 67.1 |
| 33 | —Cl | -NH-C₆H₄-NHCOCH₃ | 27.1 | 0.90 | 60.2 |
| 34 | -NH-C₆H₄-SO₃H | -NH-C₆H₃(CH₃)-SO₃H | 29.8 | 1.31 | 41.0 |
| 35 | —OCH₃ | —NCH₂CH₂OH | 41.7 | 0.66 | 76.0 |
| 36 | —N(C₂H₅)₂ | —N(CH₂CH₂CN)₂ | 41.7 | 0.92 | 49.4 |

TABLE I-continued

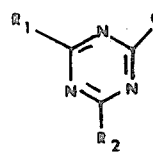

| Example No. | R₁ | R₂ | % Stain Removed Control | Activator (g.) | % Stain Removed |
|---|---|---|---|---|---|
| 37 | —Cl | —Cl | 30.5 | 0.54 | 65.8 |
| 38 | —Cl | —NH—(2-chlorophenyl) | 40.5 | 0.85 | 62.5 |
| 39 | —Cl | —N(morpholino) | 39.5 | 0.71 | 74.8 |
| 40 | —Cl | —N(CH₂CH₂OEt)₂ | 43.9 | 0.93 | 54.2 |
| 41 | —Cl | —NHOCH₃ | 36.0 | 0.59 | 56.6 |

TABLE II

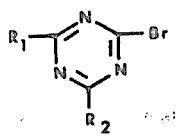

| Example No. | R₁ | R₂ | % Stain Removed Control | Activator (g.) | % Stain Removed |
|---|---|---|---|---|---|
| 11 | —OCH₃ | —OCH₃ | 36.6 | 0.66 | 79.5 |
| 42 | —Br | —Br | 36.6 | 0.95 | 43.3 |
| 43 | —Br | —OCH₃ | 30.0 | 0.81 | 57.2 |
| 44 | —Br | —N(C₂H₅)₂ | 30.0 | 0.93 | 57.2 |

We claim:

1. A bleaching composition consisting essentially of hydrogen peroxide or a hydrogen peroxide-releasing compound and an activating amount of a halo-triazine compound represented by the formula:

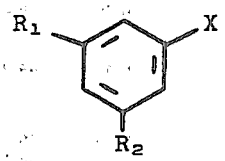

where X represents chlorine and bromine; and R₁ and R₂ individually represent chlorine, bromine, hydroxy, mercapto, lower alkyl, lower alkoxy, phenoxy, dimethoxyphosphinyl or

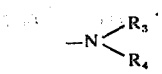

where R₃ and R₄ individually represent hydrogen, lower alkyl, lower cyanoalkyl, lower hydroxyalkyl, ethoxyethyl, phenyl, or chlorophenyl, or where R₃ and R₄ taken together complete a ring structure selected from morpholine, piperazine, piperidine, succinimide, maleimide and phthalimide rings wherein the mole ratio of the halo-triazine compound to the hydrogen peroxide-releasing compound is from about 1:1 to about 1:10.

2. A bleaching composition according to claim 1 wherein the hydrogen peroxide-releasing compound is sodium perborate or sodium percarbonate.

3. A bleaching composition according to claim 2 wherein the halo-triazine compound is represented by the formula

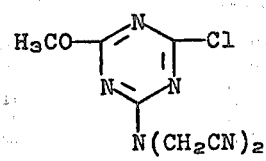

4. A bleaching composition according to claim 2 wherein the halo-triazine compound is represented by the formula

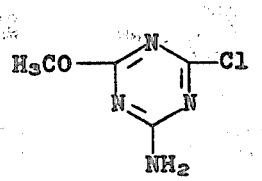

5. A bleaching composition according to claim 2 wherein the halo-triazine compound is represented by the formula

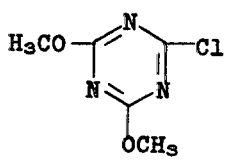

6. A bleaching composition according to claim 2 wherein the halo-triazine compound is represented by the formula

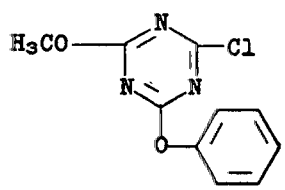

7. A bleaching composition according to claim 2 wherein the halo-triazine compound is represented by the formula

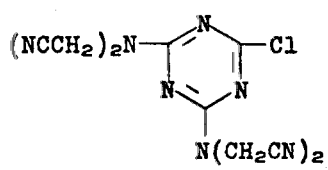

8. A bleaching composition according to claim 2 wherein the halo-triazine compound is represented by the formula

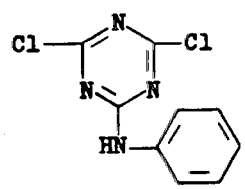

9. A bleaching composition according to claim 2 wherein the halo-triazine compound is represented by the formula

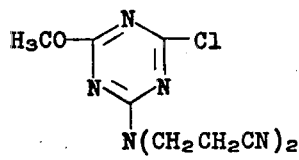

10. A bleaching composition according to claim 2 wherein the halo-triazine compound is represented by the formula

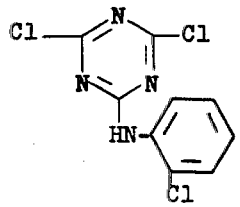

11. A bleaching composition according to claim 2 wherein the halo-triazine compound is represented by the formula

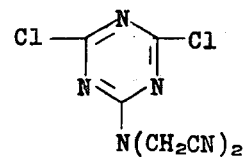

12. A bleaching composition according to claim 2 wherein the halo-triazine compound is represented by the formula

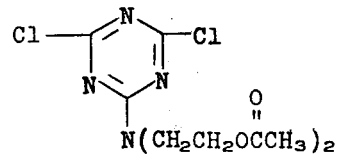

13. A bleaching composition according to claim 2 wherein the halo-triazine compound is represented by the formula

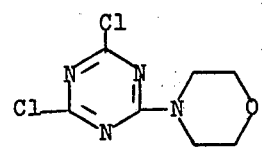

14. A bleaching composition according to claim 2 wherein the halo-triazine compound is represented by the formula

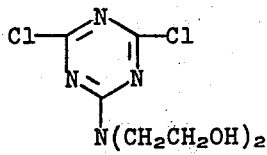

15. A bleaching composition according to claim 2 wherein the halo-triazine compound is represented by the formula

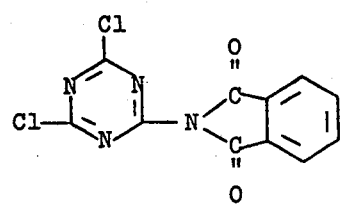

16. A bleaching composition according to claim 1 containing a water-soluble detergent.

* * * * *